UNITED STATES PATENT OFFICE 2,640,060

β-HYDROXYETHYL-THIO-ANTHRAQUINONES

Victor S. Salvin, Irvington, and Edward F. Landau, Morristown, N. J., assignors to Celanese Corporation of America, New York, N. Y., a corporation of Delaware No Drawing. Application September 9, 1949, Serial No. 114,915

1 Claim. (Cl. 260—378)

This invention relates to anthraquinone dyestuffs and relates more particularly to certain novel anthraquinone dyestuffs of improved characteristics with respect to the coloration of cellulose acetate and other organic derivatives of cellulose.

An object of this invention is the production of improved anthraquinone dyestuffs having an excellent degree of affinity for cellulose acetate or other organic derivatives of cellulose textile materials.

Another object of this invention is the production of anthraquinone dyes which dye cellulose acetate and other organic derivatives of cellulose in desirable red shades fast to acid fading.

Other objects of this invention will appear from the following detailed description.

We have found that anthraquinone dyestuffs of the following general formula:

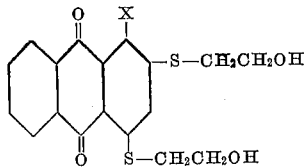

wherein X is an —NH₂ group, or an acylamino group,

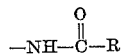

wherein R is an alkyl group of 1 to 5 carbon atoms, exhibit an excellent degree of affinity for cellulose acetate or other organic derivatives of cellulose textile materials, dyeing the same in valuable red shades of pronounced resistance to washing and acid fading. In addition, said dyestuffs may also be employed as pigments and excellent results may be obtained when they are incorporated in a cellulose acetate dope or spinning solution and the latter then spun or shaped into filaments or other objects.

Our novel dyestuffs are obtained by reacting 1-amino-2-sulfo-4-brom-anthraquinone with 2-mercapto-ethanol at reflux temperature for 3 to 8 hours employing dilute aqueous sodium hydroxide as the reaction medium. The product which forms, 1 - amino-2,4 - di-β-hydroxyethyl-thio-anthraquinone, is separated by filtration, washed with hot water and dried.

When it is desired to form the acylamino derivative, the 1 - amino - 2,4 - di-β-hydroxyethyl-thio-anthraquinone is then dissolved in a suitable lower aliphatic acid such as acetic acid, propionic acid, butyric acid or valeric acid and reacted at reflux temperature with the acid anhydride corresponding to the acid employed as solvent for 1 to 5 hours in the presence of pyridine, which acts as an acylation catalyst. Acylation may also be effected employing the desired acid chloride and an inert solvent such as dioxane, for example. After reaction is completed, the reaction mixture is drowned in water and the 1 - acylamino - 2,4 - di-β-hydroxyethyl-thio-anthraquinone which is in suspension is filtered, washed and dried.

In order further to illustrate our invention, but without being limited thereto, the following examples are given:

Example I

A reaction mixture consisting of 10 parts by weight of 1 - amino - 2-sulfo-4-brom-anthraquinone, 15 parts by weight of a 10% aqueous solution of sodium hydroxide, 9 parts by weight of 2-mercapto-ethanol and 500 parts by weight of water are heated under reflux for 5 hours. During this period, the color of the reaction mixture changes in shade from orange to a cherry red. The 1 - amino-2,4-di-β-hydroxyethyl-thio-anthraquinone formed is separated by filtration, washed with hot water and dried. A yield of 70% of theory is obtained. When a cellulose acetate fabric is dyed with this dyestuff, the fabric is dyed a bright bluish red. Dyeing may be conveniently effected employing the usual disperse aqueous dyebath containing soap and Turkey Red oil and dyeing for about 1 hour at 80° C. The dyestuff exhibits excellent affinity for the cellulose acetate material and excellent wash fastness passing the A. A. T. C. C. wash test #2. When subjected to the standard A. A. T. C. C. test for acid fading the dyed fabric exhibits a resistance to acid fading of 2 units.

Example II 3 parts by weight of 1 - amino - 2,4-di-β-hydroxyethyl-thio-anthraquinone are added to a mixture of 52.5 parts by weight of acetic acid and 5.35 parts of acetic anhydride containing about 1 part by weight of pyridine and the reaction mixture heated to reflux for 3 hours. The reaction mixture is then cooled, drowned in water and the precipitated 1-acetylamino-2,4-di - β - hydroxyethyl-thio-anthraquinone filtered off, washed and dried. A yield of 90% of theory is obtained. This dyestuff dyes cellulose acetate textile material in an orange red shade of very good affinity and wash fastness. The dyed fabric has a resistance to acid fading of 2 units in accordance with the standard A. A. T. C. C. test.

While the application of the novel dyestuffs of our invention has been more particularly described in connection with the dyeing of cellulose acetate materials, textile materials having a basis of other organic derivatives of cellulose may be dyed with our novel dyestuffs as well. Examples of other organic derivatives of cellulose are cellulose esters such as cellulose propionate, cellulose butyrate, cellulose acetate-propionate and cellulose acetate-butyrate as well as cellulose ethers such as ethyl cellulose and benzyl cellulose. Synthetic linear polyamides or polyurethane textile materials may also be dyed with said dyestuffs.

It is to be understood that the foregoing detailed description is given merely by way of illustration and that many variations may be made therein without departing from the spirit of our invention.

Having described our invention, what we desire to secure by Letters Patent is:

Process for the production of the anthraquinone dyestuff:

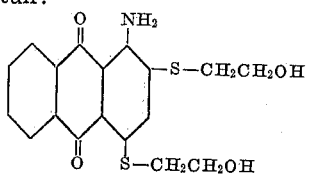

which comprises reacting 1-amino 2-sulfo-4-bromo-anthraquinone with 2-mercapto ethanol at reflux temperature for 3 to 8 hours in the presence of dilute aqueous sodium hydroxide.

VICTOR S. SALVIN.
EDWARD F. LANDAU.

References Cited in the file of this patent

UNITED STATES PATENTS

| Number | Name | Date |
|---|---|---|
| 1,062,990 | Nawiasky | May 27, 1913 |
| 1,710,992 | Kranzlein et al. | Apr. 30, 1929 |

FOREIGN PATENTS

| Number | Country | Date |
|---|---|---|
| 29,139 | Great Britain | Sept. 1910 |
| 251,115 | Germany | May 1911 |